(12) United States Patent
Salamatov et al.

(10) Patent No.: US 10,430,254 B2
(45) Date of Patent: *Oct. 1, 2019

(54) COMPOSE APPLICATION EXTENSION ACTIVATION

(71) Applicant: Microsoft Technology Licensing, LLC, Redmond, WA (US)

(72) Inventors: Andrew Salamatov, Seattle, WA (US); Jason Henderson, Redmond, WA (US); Oleg Ouliankine, Redmond, WA (US); Pretish Abraham, Sammamish, WA (US); Philip Yue-Leung Chan, Redmond, WA (US); Kee Hyuk Park, Seattle, WA (US); Shivani Chaturvedi, Redmond, WA (US); Sudhakar Pasupuleti, Issaquah, WA (US); Paul Virag, Seattle, WA (US); Angela So, Redmond, WA (US); Chia-Wei Chang, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,340

(22) Filed: Jan. 5, 2017

(65) Prior Publication Data

US 2017/0116006 A1 Apr. 27, 2017

Related U.S. Application Data

(63) Continuation of application No. 14/089,043, filed on Nov. 25, 2013, now Pat. No. 9,672,079.

(51) Int. Cl.
G06F 9/54 (2006.01)
G06F 9/445 (2018.01)
G06F 9/451 (2018.01)

(52) U.S. Cl.
CPC .......... *G06F 9/541* (2013.01); *G06F 9/44526* (2013.01); *G06F 9/451* (2018.02)

(58) Field of Classification Search
None
See application file for complete search history.

(56) References Cited

U.S. PATENT DOCUMENTS 6,785,867 B2 8/2004 Shaffer et al.
8,381,206 B2 2/2013 Balko et al.
(Continued)

FOREIGN PATENT DOCUMENTS

CN 101421714 A 4/2009
CN 102394838 A 3/2012
(Continued)

OTHER PUBLICATIONS

U.S. Appl. No. 14/089,043, Amendment after Allowance filed Mar. 23, 2017, 7 pages.
(Continued)

*Primary Examiner* — Syed A Roni
(74) *Attorney, Agent, or Firm* — Merchant & Gould

(57) ABSTRACT

Activating an extension includes opening a first compose application by a first computing device. A composed document is received, and an extension is activated in response to the document. The extension may be activated as the document is being composed.

19 Claims, 7 Drawing Sheets

(56) References Cited

U.S. PATENT DOCUMENTS

| | | | |
|---|---|---|---|
| 2002/0035581 A1* | 3/2002 | Reynar | G06F 17/2785 715/205 |
| 2004/0107089 A1 | 6/2004 | Gross et al. | |
| 2005/0076037 A1 | 4/2005 | Shen et al. | |
| 2006/0085515 A1 | 4/2006 | Kurtz et al. | |
| 2007/0088851 A1* | 4/2007 | Levkovitz | |
| 2007/0150513 A1* | 6/2007 | Vanden Heuvel | G06F 17/278 |
| 2008/0201434 A1 | 8/2008 | Holmes et al. | |
| 2009/0006994 A1* | 1/2009 | Forstall | G01C 21/20 715/764 |
| 2010/0058199 A1 | 3/2010 | Gera et al. | |
| 2011/0029988 A1 | 2/2011 | Mittal et al. | |
| 2011/0106892 A1 | 5/2011 | Nelson et al. | |
| 2011/0219083 A1 | 9/2011 | Nishi et al. | |
| 2012/0284093 A1* | 4/2012 | Evans | |
| 2012/0203862 A1* | 8/2012 | Tayeb | G06F 8/61 709/217 |
| 2013/0151635 A1 | 6/2013 | Soundrapandian et al. | |
| 2013/0151942 A1 | 6/2013 | Ouliankine et al. | |
| 2013/0218985 A1* | 8/2013 | Thazhmon | G06Q 10/10 709/206 |
| 2013/0275429 A1 | 10/2013 | York et al. | |
| 2013/0283139 A1 | 10/2013 | Claux et al. | |
| 2014/0188889 A1* | 7/2014 | Martens | G06F 17/30598 707/740 |
| 2015/0150028 A1 | 5/2015 | Salamatov et al. | |
| 2015/0200885 A1 | 7/2015 | Sharp et al. | |

FOREIGN PATENT DOCUMENTS

| | | |
|---|---|---|
| CN | 103404118 A | 11/2013 |
| EP | 2549383 | 1/2013 |
| WO | 2013085753 | 6/2013 |

OTHER PUBLICATIONS

U.S. Appl. No. 14/089,043, Notice of Allowance dated Mar. 21, 2017, 2 pages.

U.S. Appl. No. 14/089,043, USPTO Response dated Mar. 31, 2017, 2 pages.

"Context.IO", Published on: Jan. 3, 2012, http://context.io/use-cases/crm, 3 pages.

"Microsoft SharePoint 2010 SocialFest—Tim Uy and Jim Hsia share how Loqu8 Prelude Empowers Users with Just-in-Time, Contextual Information", Published on: Jan. 29, 2010, http://blogs.technet.com/b/bizspark_archives/archive/2010/01/29/microsoft-sharepoint-2010-socialfest-tim-uy-and-jim-hsia-share-how-loqu8-prelude-empSERGE BARYSIUKowers-users-with-just-in-time-contextual-information.aspx, 1 page.

Byrne, Randy, "What's New for Outlook 2013 Developers", Published on: Jul. 23, 2013, http://msdn.microsoft.com/en-us/library/office/jj228679.aspx, 17 pages.

PCT International Preliminary Report on Patentability in PCT/US2014/066483, dated Apr. 6, 2016, 9 pages.

PCT International Search Report in PCT/US2014/066483, dated Jun. 18, 2015, 15 pages.

PCT Second Written Opinion Issued in PCT/US2014/066483, dated Dec. 18, 2015, 5 pages.

U.S. Appl. No. 14/089,043, Amendment and Response filed Feb. 9, 2015, 13 pages.

U.S. Appl. No. 14/089,043, Amendment and Response filed Aug. 27, 2015, 16 pages.

U.S. Appl. No. 14/089,043, Amendment and Response filed Apr. 13, 2016, 12 pages.

U.S. Appl. No. 14/089,043, Amendment and Response filed Sep. 27, 2016, 9 pages.

U.S. Appl. No. 14/089,043, Amendment and Response filed Jan. 5, 2017, 7 pages.

U.S. Appl. No. 14/089,043, Notice of Allowance dated Oct. 5, 2016, 13 pages.

U.S. Appl. No. 14/089,043, Notice of Allowance dated Jan. 31, 2017, 14 pages.

U.S. Appl. No. 14/089,043, Office Action dated Nov. 7, 2014, 23 pages.

U.S. Appl. No. 14/089,043, Office Action dated May 29, 2015, 24 pages.

U.S. Appl. No. 14/089,043, Office Action dated Jan. 13, 2016, 22 pages.

U.S. Appl. No. 14/089,043, Office Action dated Jun. 8, 2016, 25 pages.

"Office Action Issued in European Patent Application No. 14812060.3", dated Jun. 29, 2018, 5 Pages.

"First office action Issued in Chinese Patent Application No. 201480064394.5", dated Jun. 1, 2018, 13 Pages.

"Second Office Action Issued in Chinese Patent Application No. 201480064394.5", dated Jan. 4, 2019, 12 Pages.

Webster, Lara, "Adding Links to Facebook Messages", Retrieved from <<https://web.archive.org/web/20111228230411/https://smallbusiness.chron.com/adding-links-facebook-messages-30012.html>>, Dec. 28, 2011, 1 Page.

Elliott, Matt, "Flow to Share a Link on Facebook", Retrieved from <<https://www.cnet.com/how-to/how-to-share-a-link-on-facebook-without-sharing-the-actual-url/, May 24, 2012, 3 Pages.

* cited by examiner

COMPOSE APPLICATION EXTENSION ACTIVATION

CROSS REFERENCE TO RELATED APPLICATION

This application is a continuation of U.S. application Ser. No. 14/089,043, filed Nov. 25, 2013, and titled "Compose Application Extension Activation," now U.S. Pat. No. 9,672,079 issued on Jun. 6, 2017, the disclosure of which is hereby incorporated herein by reference.

BACKGROUND

An extension serves to extend the capabilities of or data available to a more basic host application. Such extensions are typically web based, and may provide external functionality to interact with content of the host application. External tools such as extensions can expand longevity of legacy solutions by providing new functionality to an existing application, for example.

SUMMARY

Extensions may be activated in conjunction with an application to enhance a user experience, for example. To activate an extension, a first compose application, such as an application for composing email messages, appointments, contacts, tasks, etc., is opened by a first computing device. A document composed by a user is received, for example using a compose form. An extension is activated in response to the document as the document is being composed.

The first extension may be configured to extract data from the received document and activate a second extension in response to the extracted data. The second extension is activated on a first computing device in some examples, and in other implementations, extracted and/or modified data are sent to a second computing device (e.g. via an email message) and the second extension is activated on the second, receiving computing device. Further, the extensions may be configured to modify a user interface of the compose form on one or both of the first and second computing devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
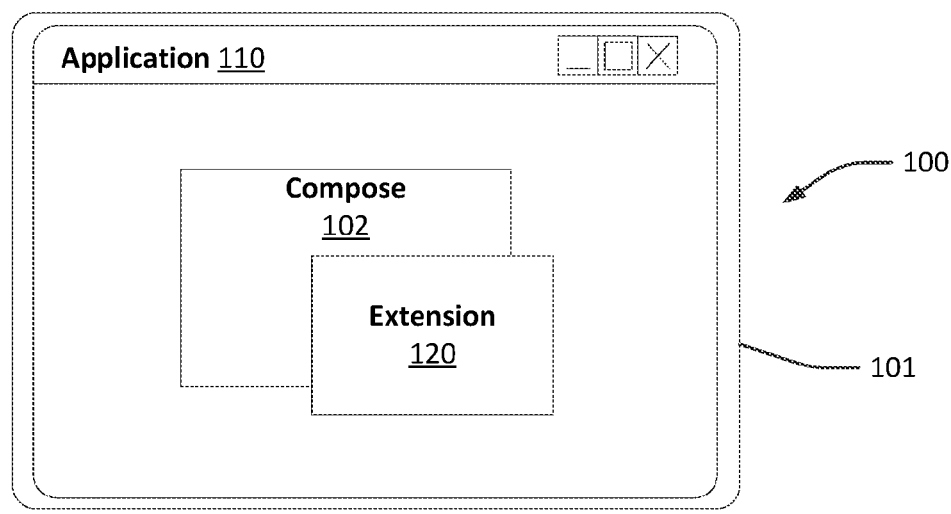
FIG. 1 illustrates aspects of an example of a general computing device including a compose application and extension.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

As used herein, an extension is an application that serves to extend the capabilities of, or data available to a more basic host application. Further, while an "add-in" program for an application may also add functionality to the host application, add-ins are typically coded to a specific version of a particular application client. In contrast, examples of the extensions disclosed herein are web based and can be cross form factor (one extension can run in both desktop, tablet, mobile, etc. platforms of a given application).

Figure 2:
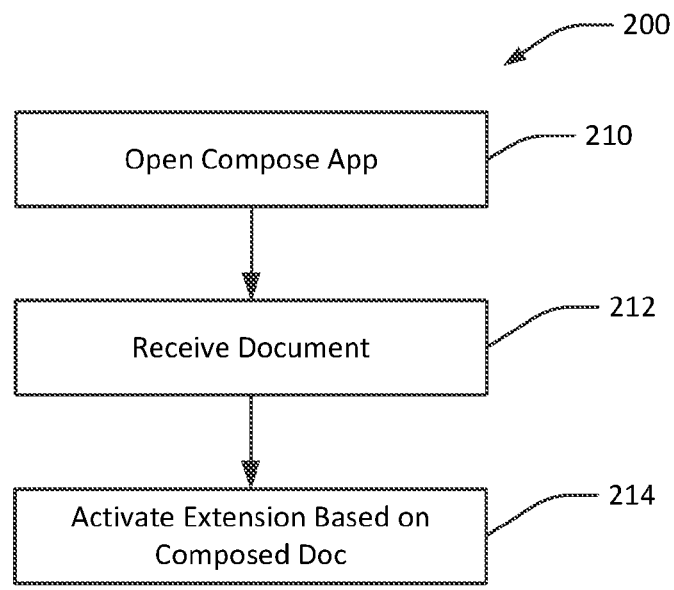
FIG. 2 illustrates aspects of an example of a method for activating an extension.

FIG. 1 illustrates aspects of an example system 100 including a computing device 101 executing an application 110 that has a compose form 102 and an extension 120. FIG. 2 is a flow diagram illustrating an example of a method 200 for activating the extension 120. As will be discussed further below, the system 100 is operable to open the compose application 110 as shown in block 210. The compose application 110 includes the compose form 102 that is configured to receive input from a user, such as an email document, a task, an appointment, etc. The extension 120 is activated in response to the document as the document is being composed by a user.

Typical extensions are activated based on a static document, such as a received email message. In certain examples disclosed herein, extensions 120 can be activated dynamically based on content of a document as the document is being created by a user. In some embodiments, the application 110 is an electronic message mail application, and the compose form 102 may be configured to receive any of an email message, instant message, appointment, contact, task, etc., and the extension 120 is dynamically activated based on properties of the composed document, content that the user wrote or is writing. Thus, if the received document includes a predetermined property, such as predetermined terms, times, dates, etc., the extension 120 is activated. Further, a plurality of the extensions 120 are associated with respective predetermined properties in some embodiments, so that different extensions 120 are activated in response to the document input via the compose form 102 including the respective properties.

For example, if the composed document received in block 212 using the compose form 102 of the application 110 is an appointment scheduled to begin at noon, a restaurant extension could activate that displays lunch reservation forms or a menu. If the document being composed is an email message discussing a sales transaction, an online payment extension could be activated in response to the composed document. While the embodiments provided thus far are described with respect to activating an extension based on predetermined properties, in other embodiments, the properties may be dynamically determined, for example, based upon patterns identified in the user's input or interaction with the application. For instance, the extension could also activate based on running a regular expression or natural language detection to identify intent from the text the user wrote (e.g., the user wrote down his SSN in the email, and an extension activates to tell him that writing his SSN is not allowed).

As noted above, the compose form 102 of the application 110 could be one of a plurality of different compose forms for inputting respective document types, such as compose forms for an email message, instant message, appointment, contact, task, etc. In some implementations, the extension 120 may be configured so as to activate for any such compose form via an application programming interface (API) associated with the application 110 that provides an interface for extensions 120 to the various input forms 102. In other embodiments, different compose forms 102 have respective APIs that are unique to the respective form 102, whereby the extensions 120 may be developed so as to change the format of the various compose forms 102, for example. This facilitates changing the user interface and user experience of the application 110 via the extension 120.

Figure 3:
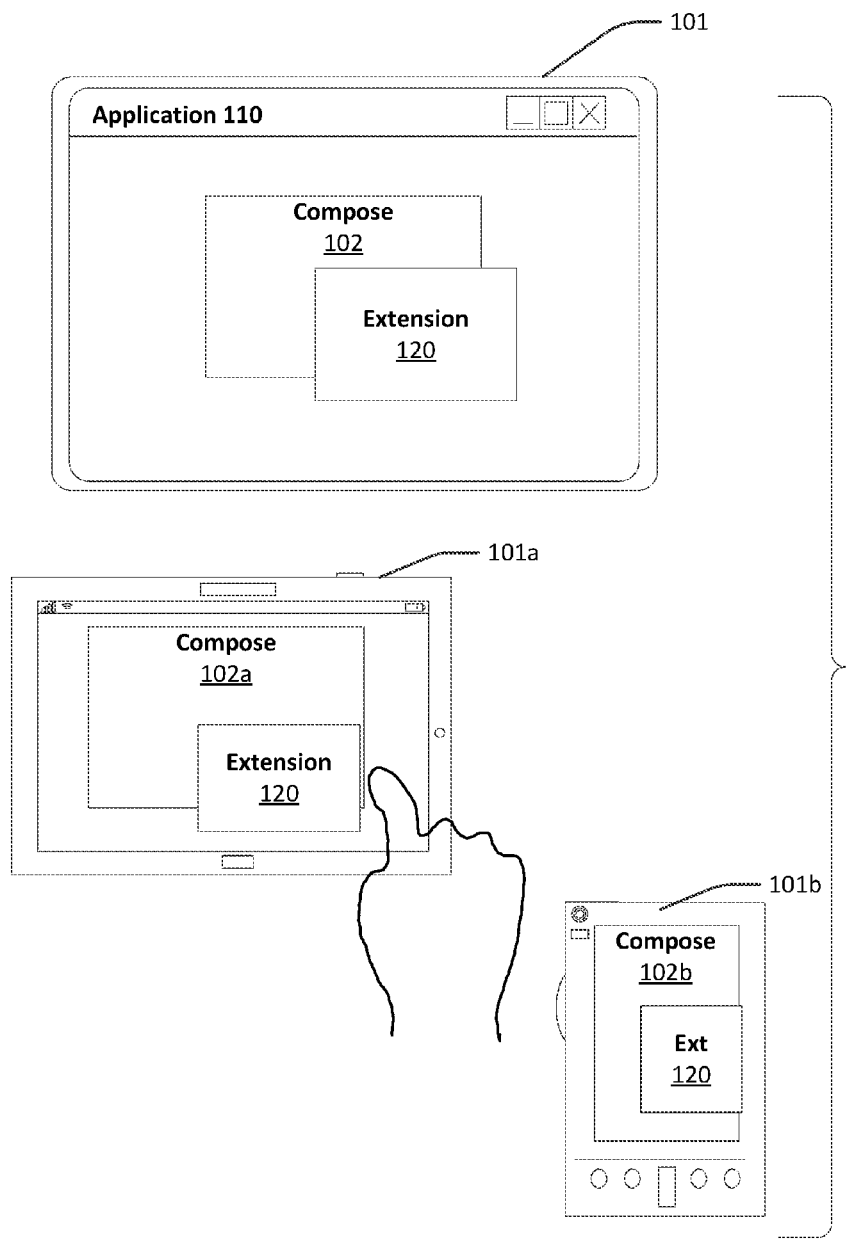
FIG. 3 illustrates examples of various platforms including a compose application and extension.

In some examples, extensions 120 are configured such that a given extension 120 may activate on different platforms. The platform may be a computing device running under a particular operating environment (e.g. MICROSOFT, APPLE, GOOGLE), an environment such as a thin client (e.g. a browser), a rich client, and the like. FIG. 3 illustrates the computing device 101 shown in FIG. 1 with the associated compose form 102 and extension 120, as well as a tablet computing device 101a and a mobile computing device such as a mobile "smart" phone 101b. The tablet 101a and the mobile phone 101b each include corresponding applications including compose forms 102a, 102b. In the illustrated implementation, the extension 120 is configured so as to be activatable on any of the illustrated computing devices 101,101a,101b based on a document input and received by the respective compose form 102,102a,102b. The extension 120 may be activated on the different platforms regardless of whether the computing devices 101, 101a, 101b utilize the same or different operating systems and/or the compose forms 102, 102a, and 102b are generated by the same or different applications. Activating the "same" extension 120 (e.g., a single set of program instructions executable by a plurality of platforms) simplifies the extension development process by eliminating or reducing the need for developing and maintaining program instructions for each of the various platforms. This is facilitated, for example, by developers specifying the APIs required for the particular extension 120, and activating the extension on any platforms that satisfy the API requirements.

Figure 4:
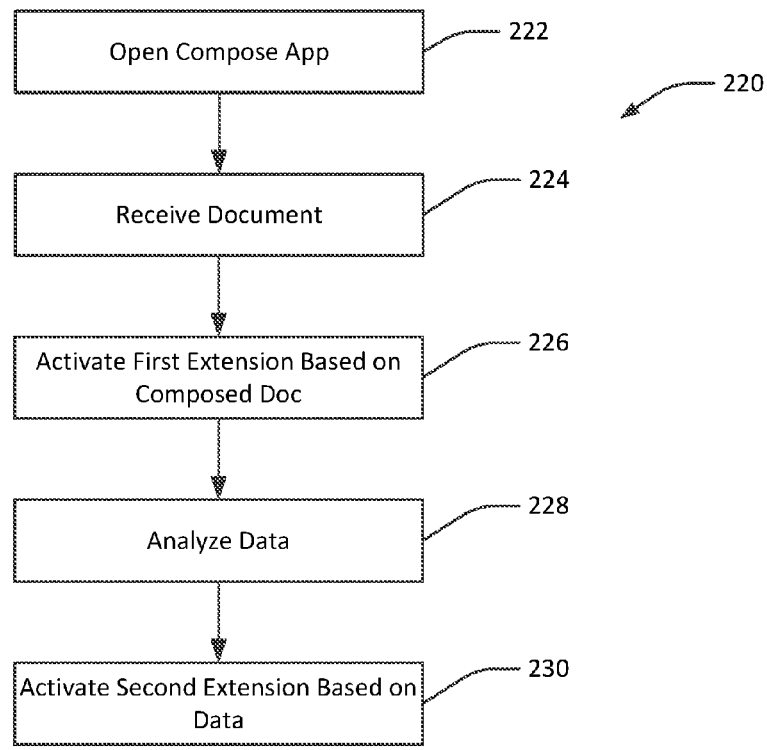
FIG. 4 illustrates aspects of an example of a method for activating extensions.

FIG. 4 is a flow diagram illustrating further aspects of methods disclosed herein. Similarly to the method 200 shown in FIG. 2, the method 220 shown in FIG. 4 includes opening the compose application 110 in block 222. The compose application 110 includes the compose form 102 that is configured to receive a document input from a user as illustrated in block 224. The extension 120 is activated in response to composed document in 226. In block 228, the extension 120 analyzes data in the received document, and in response to the data, another extension is activated in block 230.

For example, an email message input by a user and received in block 226 contains predetermined properties. The predetermined properties may include terms or dates indicating the document concerns scheduling a meeting. In response thereto, an extension 120 could be activated in block 226 that provides a calendar to the user. As noted above, the extension 120 is web based in some embodiments, so the extension could open a web browser within the application 110, activating a calendar application specified by the extension 120. The extension 120 could then, for example, extract further data indicating the meeting is being scheduled at a meal time. In response, a second extension is activated in block 230 to provide menus to the user, allowing the user to select food for the meeting scheduled via the first extension 120. One of skill in the art will appreciate that the predetermined properties may vary according to the type of compose form being used.

In some implementations, the extension activated in block 226 is configured to modify and/or schematize data from the received document 224 as a property. As used herein, "schematize" refers generally to formatting data that are attached to a document (message, task, appointment, contact, etc.) in a well-known and centrally declared format. Access to the document input in block 224 using the compose form 102 may be provided to the extension via the appropriate APIs, for example. The schematized data may be attached to the composed message by the either of the first or second extensions activated in blocks 226 and 230, or the second extension may initiate another message for sending the schematized data to a recipient, for example.

Figure 5:
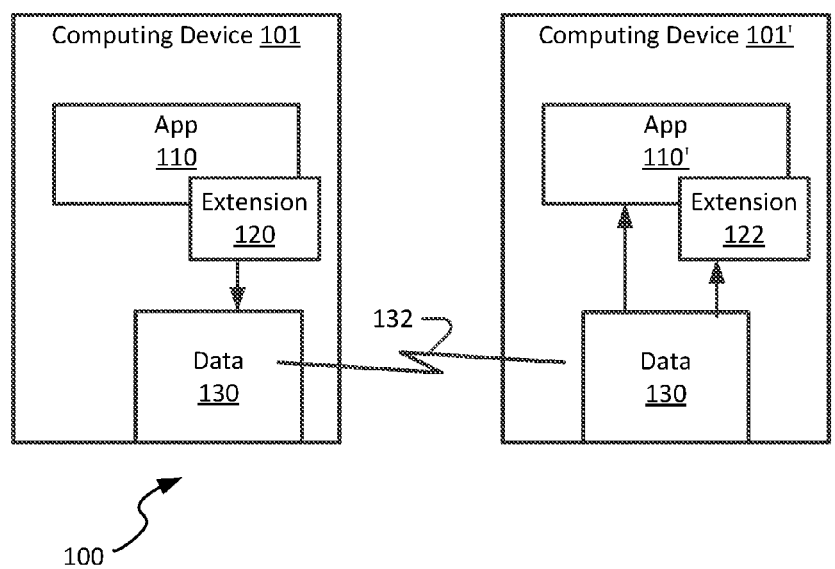
FIG. 5 illustrates aspects of example of computing devices including a compose application and extension.

FIG. 5 illustrates further aspects of the system 100. The system 100 includes the computing device 101 running the compose application 110 and activated extension 120. Data 130 has been extracted from a document input by a user as shown in block 228 of FIG. 4. As noted above, the extracted data 130 may be schematized as a property. In some implementations, the schematized data 130 is then transmitted via a communication connection 132 to a second computing device 101'. The schematized data 130 may be transmitted by the extension 120 as an attachment to the document input in block 224, or as a separate message. The data extraction, schematization and transmission may or may not be transparent to the user.

The extracted data 130 are received by the second computing device 101', which then may consume the received data 130 in various ways. For example, the received data could be received by an application 110' on the second computing system 101', which then activates an extension 122. The extension 122 activated on the second computing system 101' could be the same as the extension 120, a variation of the extension 120, or an entirely different extension, for example. In some embodiments, the extension 120 associated with the compose application 110 is a compose extension, and the extension 122 is read version of the extension 120. In this manner, a particular user interface or user experience is triggered by data 130 contained in the composed document (email message, appointment, task, etc.). Thus, the read experience on the second computing device 101' is driven by the compose form 102 of the sending computing device 101, rather than by the receiving application 110' analyzing and acting on a received document.

The data extraction and schematization process is configured to handle the data 130 in predetermined ways. For example, the extension 120 may be configured to transmit extracted data to a predefined recipient list, or only within the user's network or organization. Or, certain types of data may be categorized and transmitted to appropriate recipient groups.

FIGS. 6-9 and the associated descriptions provide a discussion of a variety of operating environments in which disclosed embodiments may be practiced. However, the devices and systems illustrated and discussed with respect to FIGS. 6-9 are for purposes of example and illustration and are not limiting of a vast number of computing device configurations that may be utilized for practicing embodiments of the invention, described herein.

Figure 6:
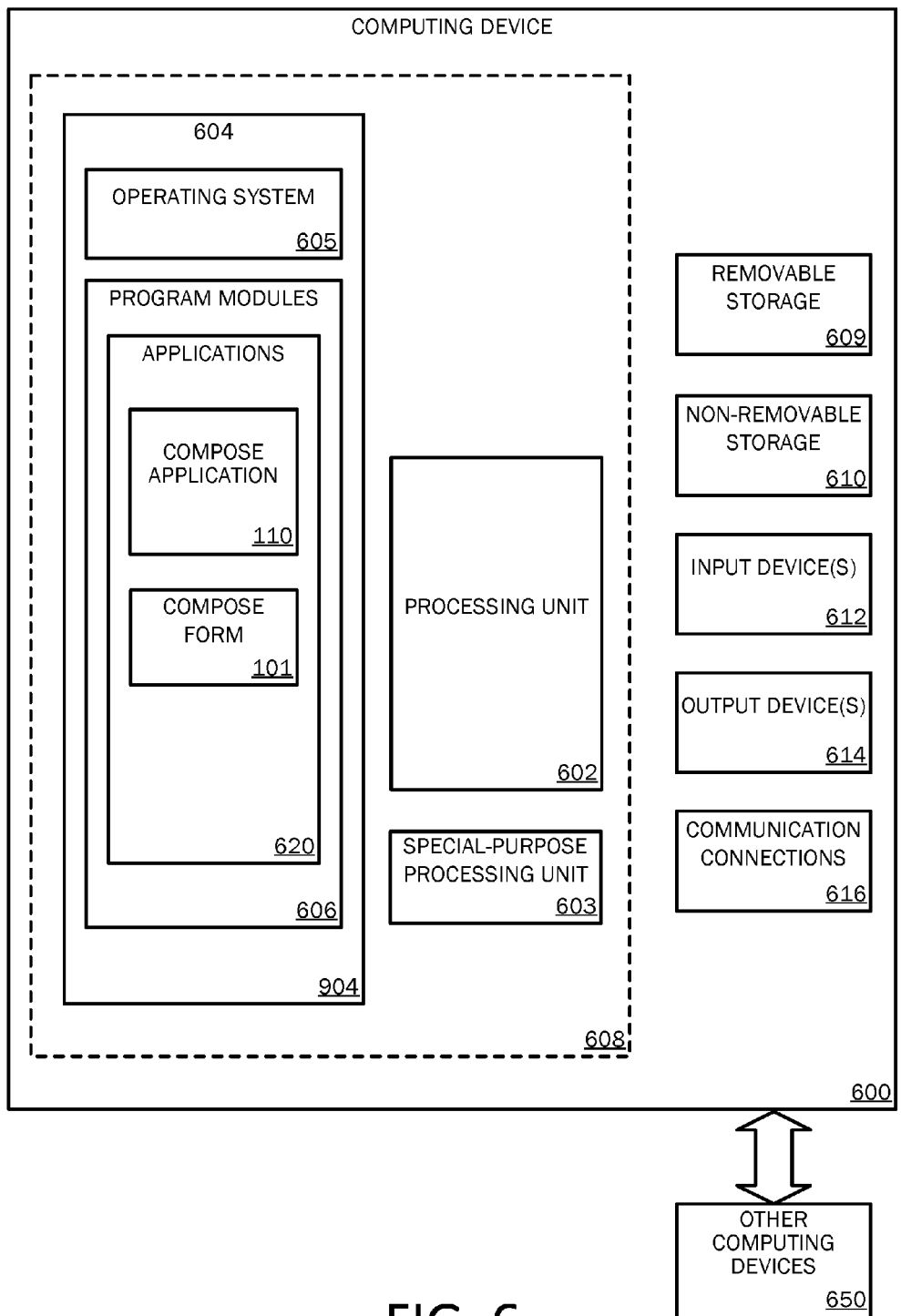
FIGS. 6, 7A, 7B and 8 and the associated descriptions provide a discussion of a variety of operating environments in which disclosed embodiments may be practiced.

FIG. 6 is a block diagram illustrating physical components (i.e., hardware) of a computing device 600 with which embodiments of the invention may be practiced. The computing device components described below may be suitable to act as the computing devices described above, such as the computing device 101 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the compose application 110 and associated compose form 102 discussed above in connection with FIG. 1. The operating system 605, for example, may be suitable for controlling the operation of the computing device 600. Furthermore, embodiments of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., compose application 110) may perform processes including, but not limited to, the operations of a message composing application and associated extensions, as described herein. Other program modules that may be used in accordance with embodiments disclosed herein, and in particular to generate screen content, may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the compose application 110 and extensions 120 may be operated via application-specific logic integrated with other components of the computing device 1800 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
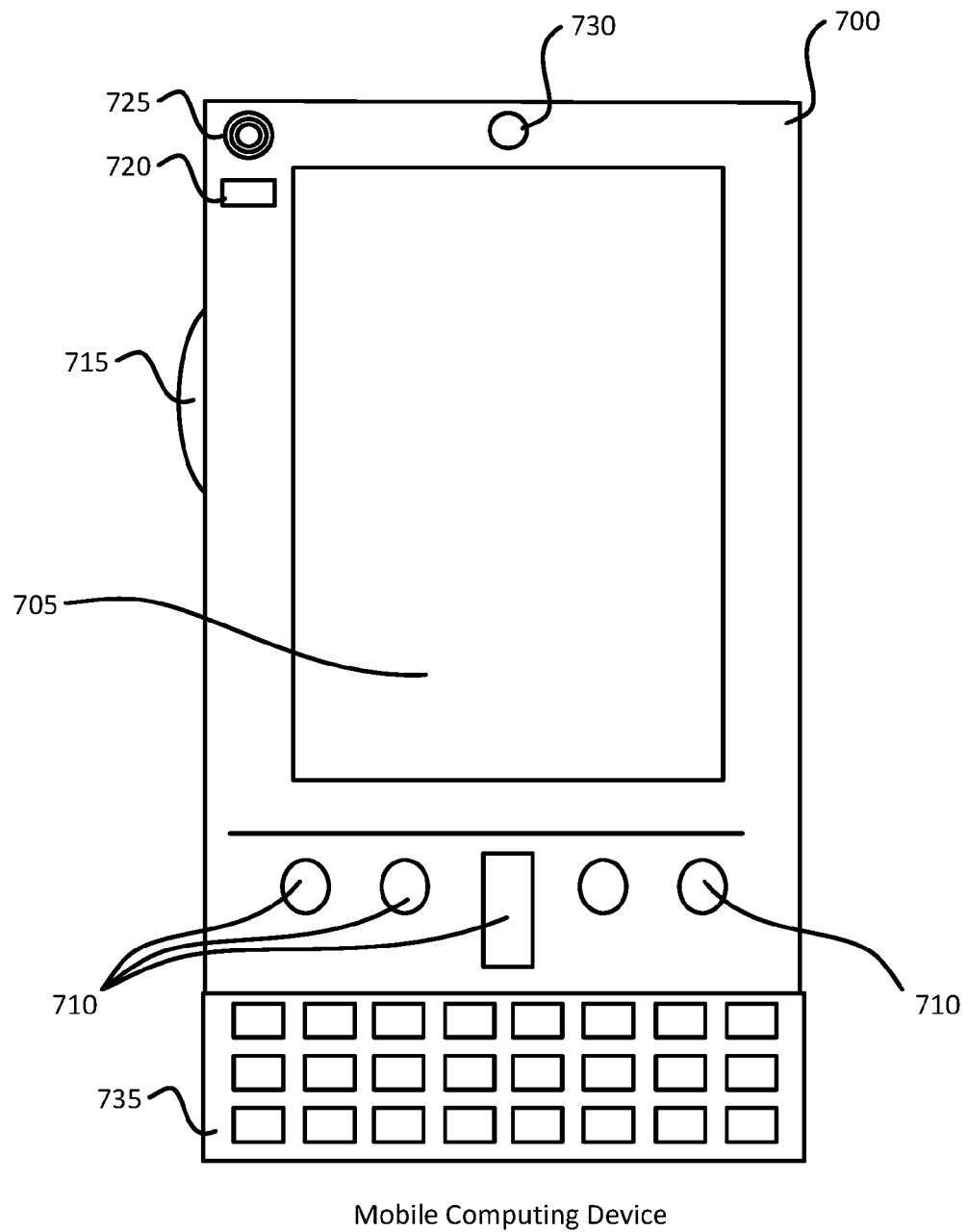
Figure 7B:
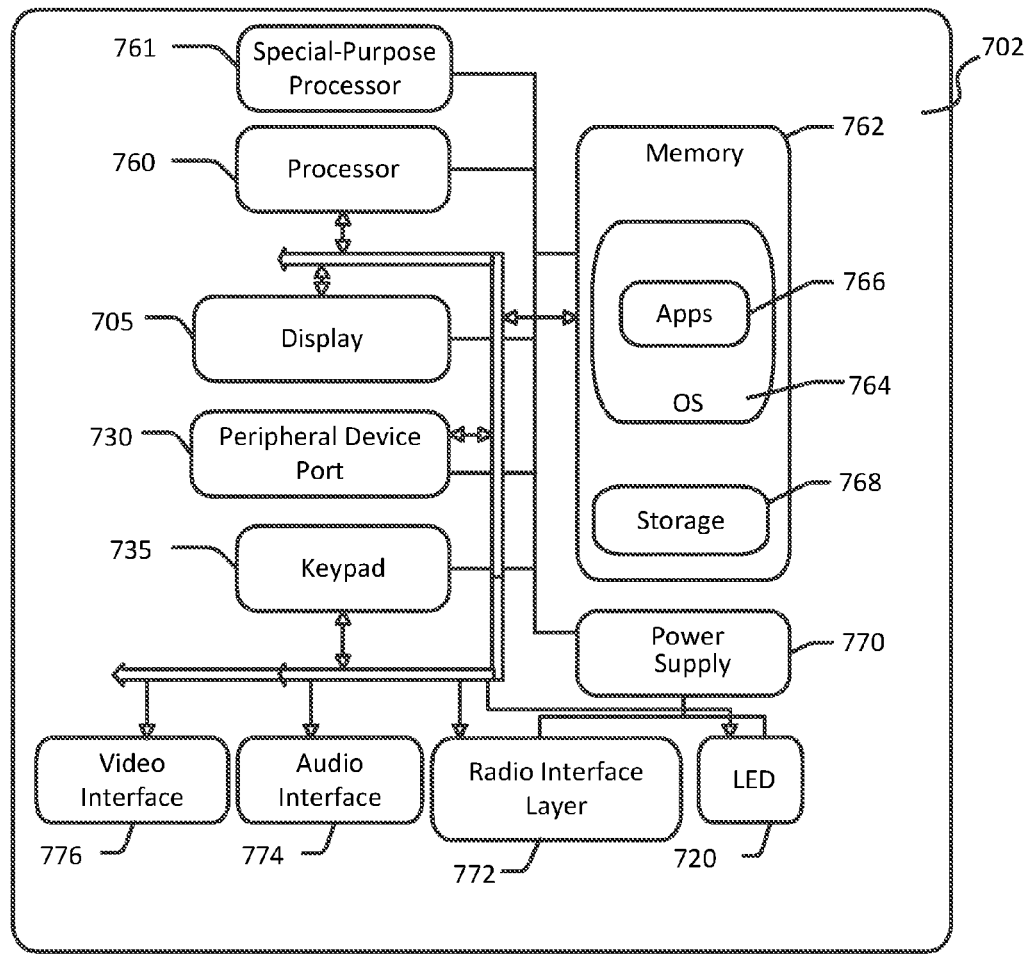

FIGS. 7A and 7B illustrate a mobile computing device 1000, for example, a mobile telephone, a smart phone, a tablet personal computer, a laptop computer, and the like, with which certain embodiments may be practiced. The mobile computing device components described below may be suitable to act as the computing devices described above, such as the tablet computing devices 101a and the mobile phone device 101b shown in FIG. 3. With reference to FIG. 7A, one embodiment of a mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 1000 can incorporate a system (e.g., an architecture) 1002 to implement some embodiments. In one embodiment, the system 1902 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including various extensions 120 as described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
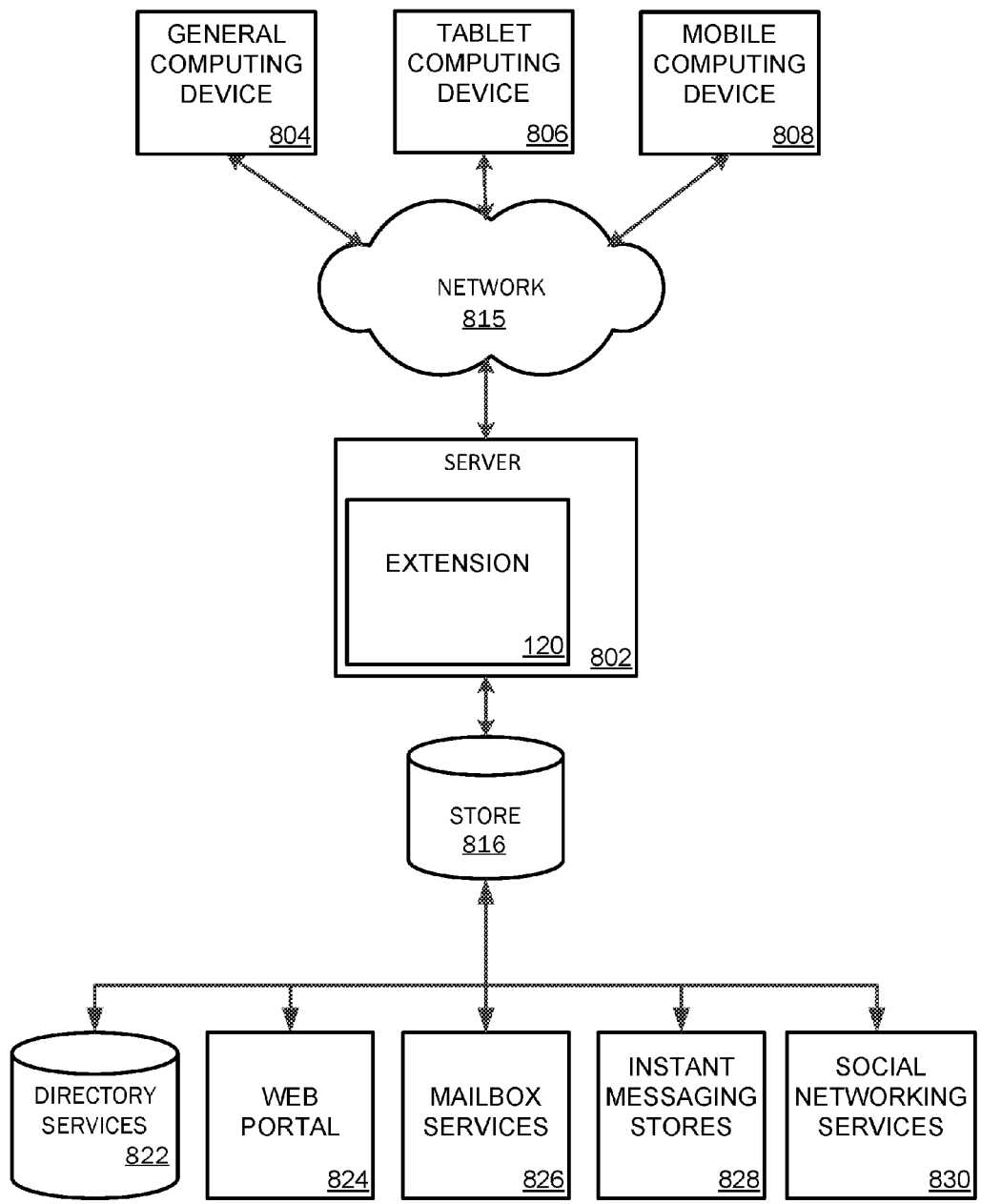

FIG. 8 illustrates one embodiment of the architecture of a system for processing data received at a computing system from a remote source, such as a computing device 804, tablet 806, or mobile device 808, as described above in conjunction with the computing device 101, tablet device 101a and mobile device 101b shown in FIGS. 1 and 3. Content displayed at server device 802 may be stored in different communication channels or other storage types. For example, various documents may be stored using a directory service 822, a web portal 824, a mailbox service 826, an instant messaging store 828, or a social networking site 830. As noted above, the extensions 120 disclosed above may be web based and thus implemented via the server 802. Any of the disclosed computing devices may obtain content from the store 816, including software code for implementing the extensions 120.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of activating an extension, comprising:
opening a compose application including a compose form at a computing device;
receiving input entered into the composed form of the compose application by a user;
analyzing the input as the input is entered into the compose form of the compose application;
dynamically activating a compose extension in response to the input being entered into the compose form of the compose application, wherein dynamically activating the compose extension includes schematizing data contained in the input entered into the compose form of the compose application and dynamically displaying content in a form different from the displayed compose form based on the schematized data; and
initiating one or more messages based on the compose extension, the one or more messages including content based on the displayed content.

2. The method of claim 1, further comprising sending the one or more messages from the computing device to a second computing device.

3. The method of claim 1, further comprising sending the schematized data to a second computing device.

4. The method of claim 3, further comprising:
receiving the schematized data by a read application on the second computing device; and
displaying the received schematized data by the read application at the second computing device.

5. The method of claim 1, wherein opening the compose application includes opening a plurality of compose forms configured to receive input.

6. The method of claim 5, further comprising providing an application programming interface (API) for interfacing the compose extension with the compose form.

7. The method of claim 1, wherein the compose form is configured to receive at least one of a message, an appointment, a contact, and a task as the input.

8. The method of claim 1, wherein dynamically activating the compose extension in response to the input being entered into the compose form of the compose application includes dynamically activating the compose extension in response to a document being composed.

9. The method of claim 1, wherein dynamically activating the compose extension in response to the input being entered into the compose form of the compose application includes dynamically activating the compose extension in response to the input including a predetermined property.

10. The method of claim 1, wherein dynamically activating the compose extension in response to the input being entered into the compose form of the compose application includes dynamically activating the compose extension in response to a first property of the input and dynamically activating a second compose extension in response to a second property of the input.

11. The method of claim 1, wherein the displayed content in the form different from the displayed compose form is selectable by the user.

12. A system for activating an extension, comprising:
a first computing device including a first processing unit and a memory, the first processing unit being operable to:
open a compose application including a compose form for receiving input entered into the compose form by a user;
analyze the input as the input is being entered into the compose form of the compose application;
dynamically activate a compose extension in response to the input being entered into the compose form of the compose application;
schematize data contained in the input entered into the compose form of the compose application;
dynamically display content in a form different from the displayed compose form based on the schematized data; and
initiate, based on the compose extension, one or more messages including content based on the displayed content.

13. The system of claim 12, wherein the compose extension is configured to send the one or more messages from the computing device to a second computing device.

14. The system of claim 13, wherein the compose extension is configured to activate a second extension at the first computing device.

15. The system of claim 12, wherein the displayed content in the form different from the displayed compose form is selectable by the user.

16. A computer storage medium storing computer-executable instructions for activating an extension, comprising:
opening a compose application including a compose form at a first computing device;
receiving input entered into the composed form of the compose application by a user;
analyzing the input entered into the compose form of the compose application;
dynamically activating a compose extension in response to the input being received by the compose form of the compose application;
based on the input entered into the compose form of the compose application by the user, modifying the compose form and displaying content in the modified compose form;
initiating one or more messages including content based on the displayed content and sending the one or more messages including the content based on the displayed content, to a second computing device.

17. The computer storage medium of claim 16, further comprising:
receiving schematized data by a read application at the second computer device; and
displaying the received schematized data by the read application at the second computing device.

18. The computer storage medium of claim 16, further comprising determining a type of extension as the input is entered into the compose form of the compose application by the user.

19. The computer storage medium of claim 16, wherein the content displayed in the modified compose form is selectable by the user.

* * * * *

UNITED STATES PATENT AND TRADEMARK OFFICE
CERTIFICATE OF CORRECTION

PATENT NO. : 10,430,254 B2  
APPLICATION NO. : 15/399340  
DATED : October 1, 2019  
INVENTOR(S) : Salamatov et al.

Page 1 of 1

It is certified that error appears in the above-identified patent and that said Letters Patent is hereby corrected as shown below:

On the Title Page

In Column 1, (72) Inventors: "Jason Henderson," should read --Jason Todd Henderson,--

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*